Figure 1:
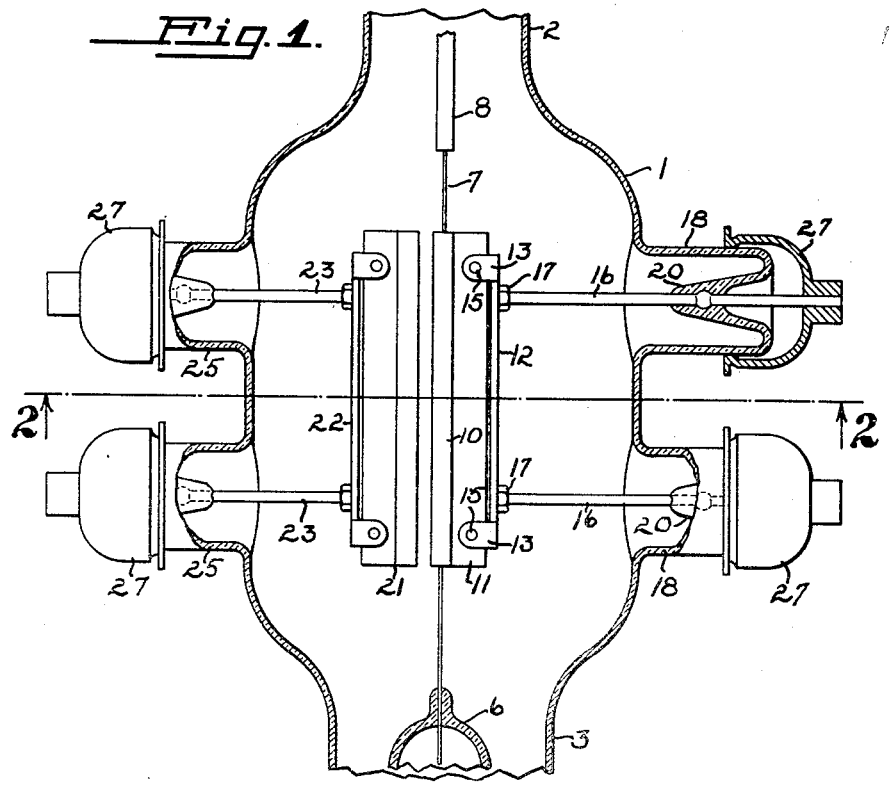

Oct. 17, 1933.  R. M. HEINTZ ET AL  1,930,713
VACUUM TUBE STRUCTURE
Filed Jan. 26, 1931

RALPH M. HEINTZ.
PHILIP F. SCOFIELD.
INVENTORS.

BY Donald K. Lippincott
ATTORNEY

Patented Oct. 17, 1933

1,930,713

UNITED STATES PATENT OFFICE 1,930,713

VACUUM TUBE STRUCTURE

Ralph M. Heintz and Philip F. Scofield, Palo Alto, Calif., assignors to Heintz & Kaufman, Ltd., San Francisco, Calif., a corporation of Nevada Application January 26, 1931. Serial No. 511,278

2 Claims. (Cl. 250—27.5)

Our invention relates to vacuum tubes, and particularly to means for supporting plate elements in said tubes.

It is well known that in order to obtain consistent performance and lack of micriphonic noises from vacuum tubes, the elements of the tube must be rigidly supported and the relative position of the elements must be definitely fixed and not subject to changes within the tube. In order to facilitate the construction of the tube it is customary to mount all of the tube elements upon a stem which is later introduced into the envelope of the tube and sealed in place. For small sizes of tubes this construction is satisfactory, but where tubes of large sizes must be made, elements thus supported are subject to vibration.

Among the objects of our invention are: First, to provide a tube assembly wherein the elements may be separately introduced into the tube and rigidly fixed into position thereafter; second, to provide a tube structure which is exceptionally rigid and free from vibration; third, to provide a tube structure wherein the seals, which connect the tube elements to the glass of the envelope, are maintained at a relatively low temperature; fourth, to provide a tube structure wherein the effective capacity between the elements of the tube is low; and fifth, to facilitate the insulation of the tube elements.

Other objects of our invention will be apparent or will be specifically pointed out in the description forming a part of this specification, but we do not limit ourselves to the embodiment of our invention herein described, as various forms may be adopted within the scope of the claims.

Figure 2:
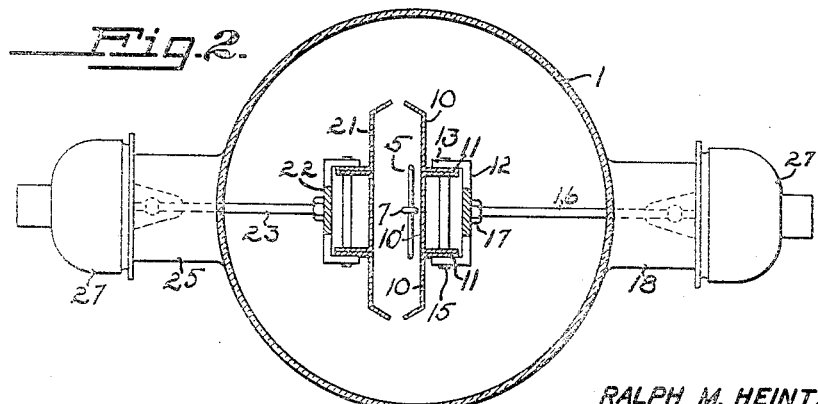

Referring to the drawing:

Figure 1 is a view, partly in elevation and partly in section, the direction of view being perpendicular to the principal axis of the tube; and Figure 2 is a transverse sectional view of the tube, the plane of section being indicated by the line 2—2 of Figure 1.

In general terms, our tube structure comprises tube elements to which supporting rods are detachably secured, the rods being permanently fixed to the envelope which encloses the tube elements. Since the supports may themselves be used as leads for the elements, this structure does away with the necessity of bringing out the leads from the various elements through a common stem, and thus improves the insulation of the tube, and also reduces the interelement capacity. It further enables the elements to be assembled within the tube, the permanent connection between the supports and the envelope serving to prevent any release of the detachable connection between the supports and the elements themselves.

The preferred embodiment of our invention as shown in the drawing is a power tube of the "gammatron" type. The envelope 1 is shown only in part, the upper and lower constricted ends 2 and 3 respectively being broken away to conserve space in the drawing. The filament 5 is supported between the stem 6, mounted in the lower end of the tube, and the hook 7 mounted on the bracket 8, at the upper end of the tube. This structure is not shown in detail since it relates only indirectly to the present invention, and is, moreover, fully disclosed in the application of Ralph M. Heintz, Serial No. 511,277, filed concurrently with this application.

Mounted on the right of the filament, as shown in the figures, is a control plate structure, which conveniently comprises the members 10 and 10', each of which is provided with flanges which are spot welded or otherwise secured together thus forming the radiating fins 11. The plate thus formed may be made of relatively light material. A bracket 12, of somewhat heavier material, has arms 13 which fit over the radiating fins and are secured thereto by pins 15.

The rods 16 which support this plate structure are detachably secured to the bracket. This is preferably accomplished by means of a simple threaded joint, a lock nut 17 being provided if desired, but a bayonet joint or other detachable fastening may be used. The envelope is provided with laterally extending arms 18, to which the supports 16 are permanently fixed by the inverted seals 20.

On the opposite side of the filament from the control plate structure is the anode plate 21. This is of substantially the same form as the control plate, and is mounted on a bracket 22 and supported by rods 23 sealed to the arms 25, which differ from the control plate mounting only in minor dimensions.

In assembling the tube, the two plates are mounted on a positioning mandrel, and are inserted in the tube while one or both of its ends are yet open, and before the insertion of the filament. The support rods 16 and 23 are then screwed in place, and the seals fastening them to the arms 18 and 25 respectively are formed. The mandrel is then withdrawn, the filaments inserted, and the tube sealed off and evacuated in the usual manner.

Metallic caps 27 are preferably cemented to the arms of the envelope, and soldered to the element supports, for the purpose of protecting the seals and of facilitating contact to the tube elements.

In the usual tube construction, the connection between the elements and their supports has customarily been made by spot welding, riveting, or other essentially non-detachable fastenings. This has been believed necessary owing to the requirement of fixed element position. In the construction herein described, loosening of the fastening to the element is impossible due to the fact that two supports are used, each of which serves to lock the other when these supports are fixed to the envelope. The result is a tube which is easily and accurately assembled, and which, owing to the plurality of supports for the elements, is exceptionally rigid and free from vibration.

Moreover, since the support rods are relatively long, and are attached to the elements through the brackets fixed to the radiating fins, the conduction of heat to the seals is relatively low, and radiation from the supports is rapid. For this reason excessive thermal stresses are not set up in the seals, and a major cause of tube breakage is minimized.

We claim:

1. In a vacuum tube, a plate structure comprising a plurality of flanged sections, the flanges on adjacent sections being secured together to form radiating fins, a bracket secured to said fins, and a support rod secured to said bracket substantially perpendicular to the plane thereof.

2. In a vacuum tube, an envelope, a plate structure within the envelope and having radiating fins formed thereon, a bracket secured to said fins, and a plurality of supports threaded into said bracket and fixed to the envelope.

RALPH M. HEINTZ.
PHILIP F. SCOFIELD.